US012380801B2

(12) United States Patent
Ogata

(10) Patent No.: US 12,380,801 B2
(45) Date of Patent: Aug. 5, 2025

(54) TRAFFIC SIGNAL CONTROL APPARATUS, CONTROL METHOD OF TRAFFIC SIGNAL MACHINE AND PROGRAM RECORDING MEDIUM

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 18/280,585

(22) PCT Filed: Mar. 10, 2021

(86) PCT No.: PCT/JP2021/009624
§ 371 (c)(1),
(2) Date: Sep. 6, 2023

(87) PCT Pub. No.: WO2022/190290
PCT Pub. Date: Sep. 15, 2022

(65) Prior Publication Data
US 2024/0144814 A1 May 2, 2024

(51) Int. Cl.
*G08G 1/01* (2006.01)
*G08G 1/081* (2006.01)

(52) U.S. Cl.
CPC .......... *G08G 1/0145* (2013.01); *G08G 1/081* (2013.01)

(58) Field of Classification Search
CPC ............................ G08G 1/0145; G08G 1/081
See application file for complete search history.

(56) References Cited

U.S. PATENT DOCUMENTS 10,192,433 B1 * 1/2019 Agarwal .......... G08G 1/096783

FOREIGN PATENT DOCUMENTS

| | | | | | |
|---|---|---|---|---|---|
| JP | H07-230595 | A | | 8/1995 | |
| JP | 2011-096143 | A | | 5/2011 | |
| JP | 2012-108664 | A | | 6/2012 | |
| JP | 2012133760 | A | * | 7/2012 | |
| JP | 2018022304 | A | * | 2/2018 | |
| JP | 2019-067249 | A | | 4/2019 | |
| JP | 2019148905 | A | * | 9/2019 | |
| JP | 2020-021305 | A | | 2/2020 | |
| JP | 7578140 | B2 | * | 11/2024 | .......... G06V 10/774 |
| WO | WO-2017126379 | A1 | * | 7/2017 | .............. G08G 1/00 |

OTHER PUBLICATIONS

International Search Report for PCT Application No. PCT/JP2021/009624, mailed on May 25, 2021.
JP Office Action for JP Application No. 2023-504991, mailed on Jun. 4, 2024 with English Translation.

* cited by examiner

*Primary Examiner* — Curtis A Kuntz
*Assistant Examiner* — James E Munion

(57) ABSTRACT

A traffic signal control apparatus comprises a determination part determining whether or not to stop the vehicle based on behavior of the vehicle entering a predetermined intersection; and a selection part selecting a traffic signal machine(s) that performs signal control for stopping the vehicle from among control target traffic signal machines. The selection part selects a traffic signal machine(s) that is located in a traveling direction of the vehicle and that may eliminate traffic jam by the signal control for stopping the vehicle.

19 Claims, 14 Drawing Sheets

FIG. 5

| TRAFFIC SIGNAL MACHINE ID | ADJACENT TRAFFIC SIGNAL MACHINES |
|---|---|
| C11 | C12 W 100m<br>C21 S 90m |
| C12 | C11 E 100m<br>C13 W 80m<br>C21 W 90m |
| C13 | C12 E 80m<br>C23 S 90m |
| | : |

TRAFFIC SIGNAL CONTROL APPARATUS, CONTROL METHOD OF TRAFFIC SIGNAL MACHINE AND PROGRAM RECORDING MEDIUM

FIELD

This application is a National Stage Entry of PCT/JP2021/009624 filed on Mar. 10, 2021, the contents of all of which are incorporated herein by reference, in their entirety.

The present invention relates to a traffic signal control apparatus, a control method of the traffic signal machine and a program recording medium.

BACKGROUND

A traffic signal is known, which has a function that, when a vehicle traveling at a speed exceeding the legal speed limit is detected, by shortening a green signal time period or extending a red signal time period of a downstream traffic signal machine, stops the vehicle at a downstream intersection so as to prevent the vehicle from traveling at a speed exceeding a legal limit (high-speed sensitive control).

Patent Literature 1 (PTL 1) discloses a traffic signal control apparatus that may more reliably control the speed of an excess speed vehicle. The traffic signal control apparatus described in PTL 1 executes a first determination to determine whether or not it is possible to stop a target vehicle to be deterred from traveling at a downstream intersection thereof, and a second determination to determine whether or not it is possible to shorten green signal time period on a road where the target vehicle will enter at the intersection. If the first and second determinations at a certain intersection are negative, the traffic signal control apparatus executes the first and second determinations for a next intersection at downstream of the intersection in traveling direction of the target vehicle.

In addition, Patent Literature 2 and Patent Literature 3 are exemplified as related literatures.

PTL 1: Tokkai JP2011-96143A
PTL 2: Tokkai JP2020-21305A
PTL 3: Tokkai JP 2012-108664A

SUMMARY

The following analysis is provided by the present inventor. As described in PTL 1, there is a case where a traffic signal machine having a high-speed sensitive control function cannot stop the target vehicle. In this point, PTL 1 discloses a method in which the target vehicle may be stopped at a traffic signal machine located ahead. However, such determination is executed based on whether it is possible or not to stop the vehicle (the first determination) and whether it is possible or not to shorten green signal time period or whether it is possible or not to extend red signal time period (the second determination). Therefore, the method of PTL 1 has a possibility that shortening of green signal time period or extension of red signal time period is executed at an improper location or timing, resulting in deterioration of traffic congestion.

It is a purpose of the present invention to provide a traffic signal control apparatus, a control method of traffic signal machine and a program recording medium that may suppress occurrence of traffic congestion and the like by virtue of signal control for stopping a particular vehicle.

According to a first aspect, there is provided a traffic signal control apparatus, comprising means for determining whether or not to stop a vehicle based on behavior of the vehicle entering a predetermined intersection; and means for selecting a traffic signal machine or machines that perform signal control for stopping the vehicle from among control target traffic signal machines. The means for selecting the traffic signal machine of the traffic signal control apparatus selects a traffic signal machine or machines that is/are located in a traveling direction of the vehicle and traffic congestion has occurred at the intersection.

According to a second aspect, there is provided a control method of a traffic signal machine, comprising: determining whether or not to stop a vehicle based on behavior of the vehicle entering a predetermined intersection, and selecting a traffic signal machine(s) that is/are located in a traveling direction of the vehicle and that traffic jam has occurred at a site where the traffic signal machine is located from control target traffic signal machines as a traffic signal machine(s) that perform(s) the signal control for stopping the vehicle. The method is connected to a specific machine as a traffic signal control apparatus that controls the traffic signal machine(s).

According to a third aspect, there is provided a computer program (referred to as program, hereinafter) for realizing above functions of a computer. Herein, the computer program is input to a computer apparatus from an input apparatus or an external device via a communication interface, stored in a storage apparatus, and causes a processor to drive according to predetermined steps or processes. In addition, the program may display a processing result including intermediate states, step by step via a display device, if necessary, or may communicate with an external device via the communication interface. A computer device for this purpose is, as an example, typically comprises a processor, a storage device, an input device, a communication interface, and a display device, if necessary, that may be connected to one another via a bus. The program may also be recorded on a computer-readable (non-transitory) storage medium. That is, the present invention may also be realized as a computer program product.

According to the present invention, it is realized to suppress occurrence of traffic congestion and the like due to signal control for stopping a particular vehicle.

BRIEF DESCRIPTION OF THE DRAWINGS

FIG. 5 is a diagram showing an example of a traffic signal machine position information stored in a traffic signal control apparatus of the first exemplary embodiment of the present invention.

EXAMPLE EMBODIMENTS

Figure 1:
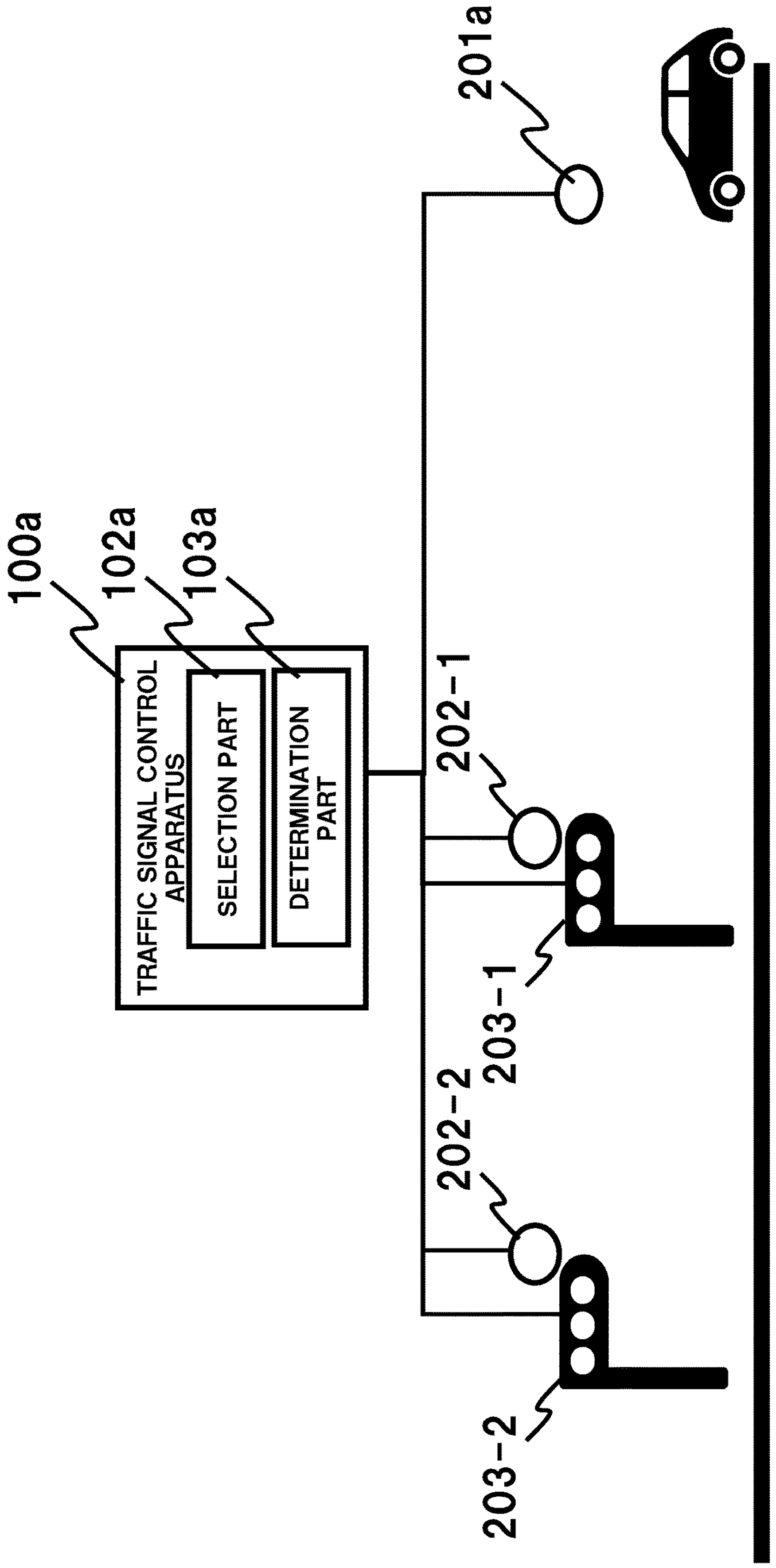
FIG. 1 is a diagram showing a configuration of one exemplary embodiment of the present invention.

First, an outline of one example embodiment of the present invention is explained with reference to drawings. Herein, symbols appended to the outline are expediently appended to each element as one example for a purpose of easy understanding, thus are not intended to limit the present invention to an illustrated mode. In addition, connection lines between blocks in the drawings and the like, made reference in the following explanation, include both of bidirection and one directional. One way arrow schematically indicates flow of main signal (data), thus does not exclude bidirection. Further, input/output connection points of each block in the drawings have a port and an interface, although omitted in the drawings. A program is executed via a computer apparatus, and the computer apparatus comprises, for example, a processor, a storage device, an input device, a communication interface and a display device, as necessary. Further, the computer apparatus is configured in a manner capable of communicating with an internal equipment or an external equipment (including a computer) via the communication interface, irrespective of a cable communication or a radio communication.

As illustrated in FIG. 1, one exemplary embodiment of the present invention may be realized by a traffic signal control apparatus 100*a* comprising a determination part 103*a* and a selection part 102*a*.

More concretely, the determination part 103*a* functions as means for determining whether or not to stop a vehicle based on behavior of the vehicle detected by a sensor 201*a* installed at a predetermined location.

The selection part 102*a* functions as means for selecting a traffic signal machine that performs signal control for stopping the vehicle from control target traffic signal machines 203-1, 203-2. Upon the selection of the traffic signal machine, the selection part 102*a* selects a traffic signal machine which is located in a traveling direction of the vehicle and may eliminate traffic jam in the cross direction by performing signal control for stopping the vehicle. Herein, whether or not performing signal control for stopping the vehicle may eliminate the traffic jam in the crossing direction may be determined by detecting vehicles and pedestrians waiting for a traffic signal with sensors 202-1 and 202-2 installed near (around) the control target traffic signal machines 203-1, 203-2. Herein, as the sensors 201*a*, 202-1, 202-2, various sensors using ultrasonic waves and optical beacon millimeter waves, as well as image-based sensors using cameras LiDAR (Light Detection and Ranging) may be used. Of course, it is not limited to install only one single sensor at one site, thus multiple sensors of one or more kinds may be installed in combination according to a detection target and parameters to be measured.

Figure 2:
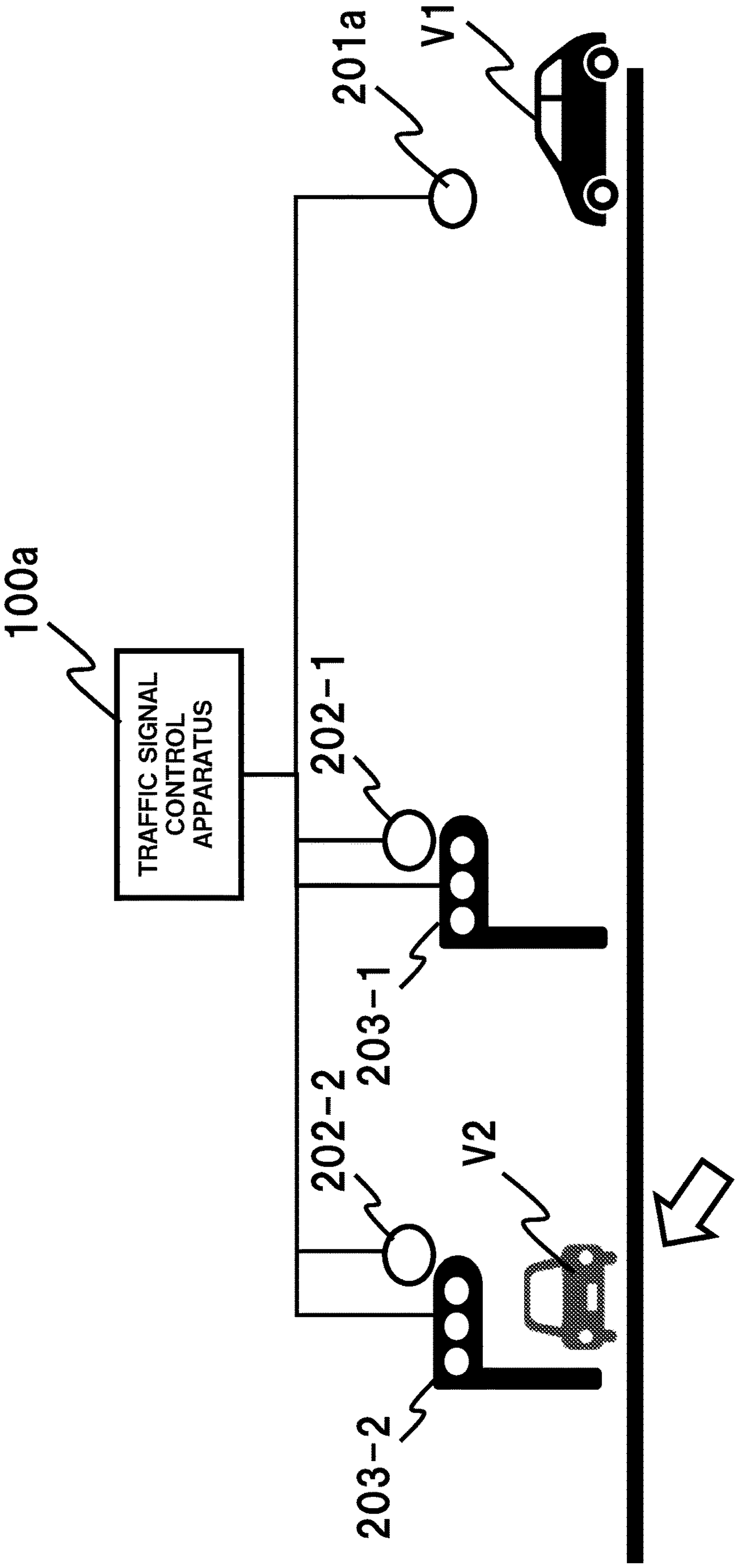
FIG. 2 is an explanatory view of operations by one exemplary embodiment of the present invention.

For example, as illustrated in FIG. 2, an assumption is made, in which a vehicle V1 travels at a speed exceeding a legal speed limit in a site where the sensor 201*a* is installed. At that time, the determination part 103*a* determines to stop the vehicle V1 based on information obtained by the sensor 201*a*.

The selection part 102*a* selects a traffic signal machine that performs signal control for stopping the vehicle V1 from among the traffic signal machines 203-1, 203-2 located in the traveling direction of the vehicle V1. At that time, the selection part 102*a* selects the traffic signal machine 203-2 that has determined the presence of a vehicle V2 waiting for signal change by the sensor 202-2. In addition, the selection part 102*a* instructs the selected traffic signal machine 203-2 to perform the signal control for stopping the vehicle V1. As the signal control for stopping the vehicle, early termination of green signal time period, extension of red signal time period, and the like may be adopted.

Figure 3:
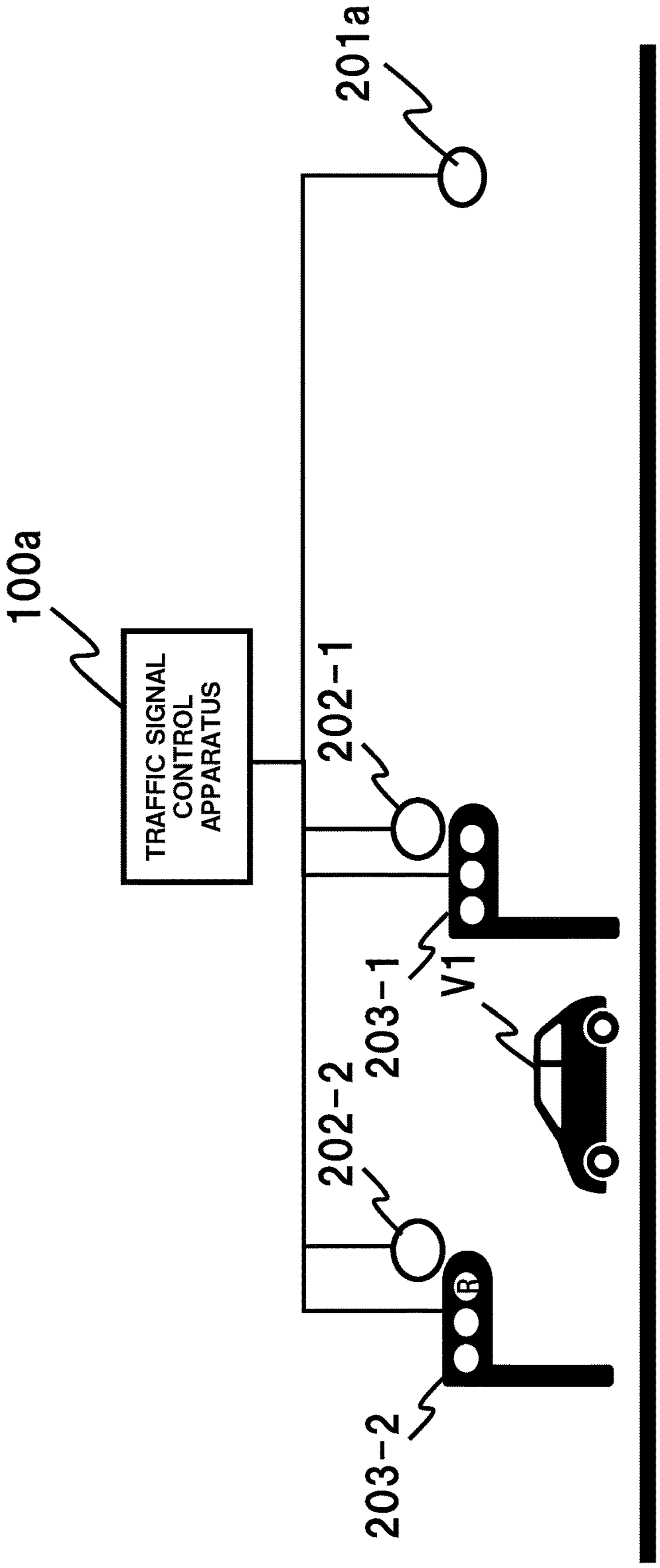
FIG. 3 is an explanatory view of operations by one exemplary embodiment of the present invention.

When the instructed traffic signal machine 203-2 performs signal control for stopping the vehicle V1, the vehicle V2 waiting for signal change at the traffic signal machine 203-2 starts to travel according to (changed) signaling of the traffic signal machine 203-2. On the other hand, as illustrated in FIG. 3, the vehicle V1 stops at the position of the traffic signal machine 203-2 according to present signaling of the traffic signal machine 203-2.

As described above. according to the present exemplary embodiment, not only stopping the target vehicle V1, but it is realized to eliminate staying of the vehicle V2 in the cross direction. In addition, early termination of the green signal time period and the extension of red signal time period at the site where the vehicle V2 stays may provide more potent necessity of stopping or deceleration to a driver of the vehicle V1 due to signal control by the traffic signal machine 203-1 having no vehicles waiting for signal change.

First Exemplary Embodiment

Figure 4:
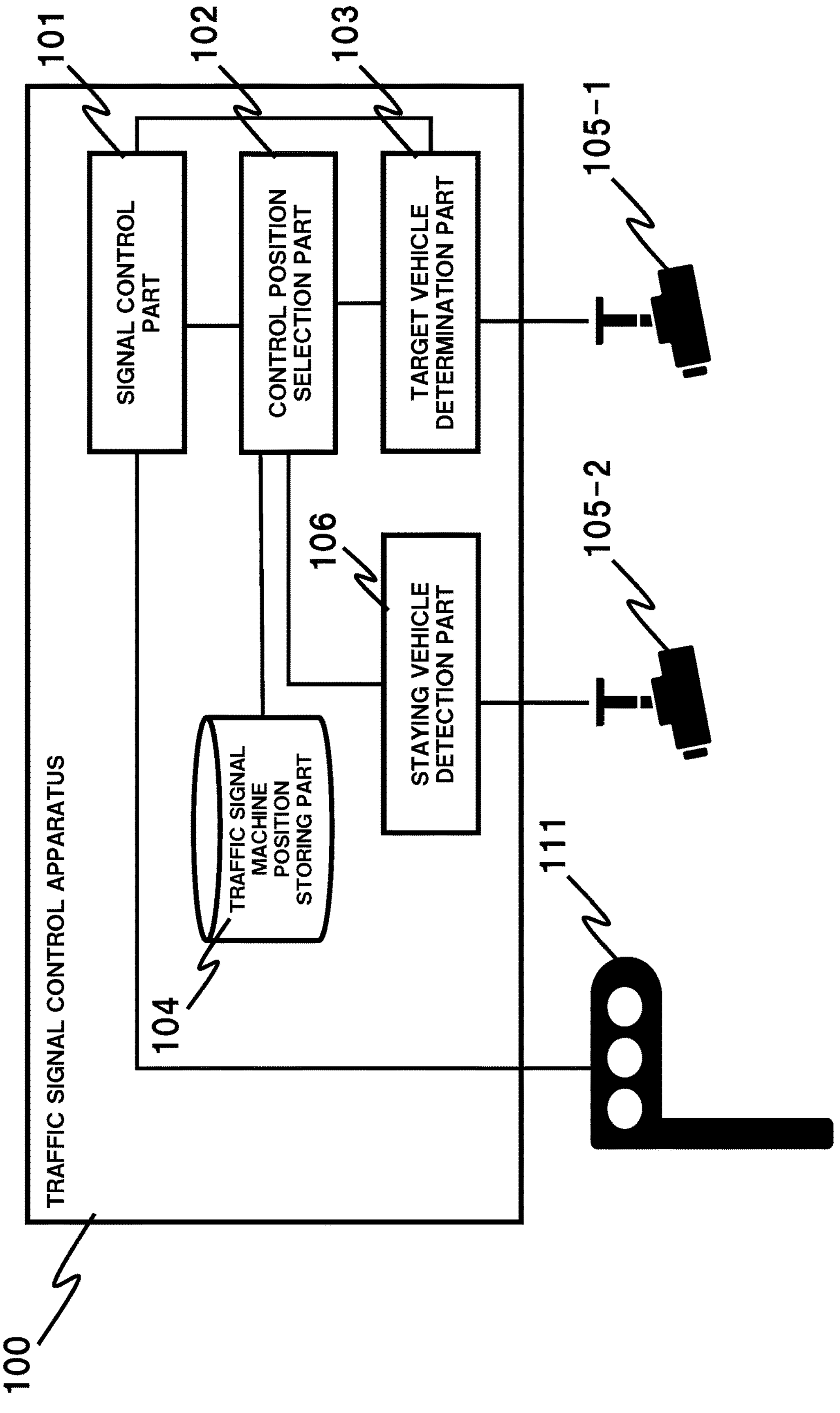
FIG. 4 is a diagram showing a system configuration of a first exemplary embodiment of the present invention.

Next, a first exemplary embodiment of the present invention is explained in detail with reference to the drawings, in which cameras are used for determination of vehicles to be targets for the stop control and detection of vehicles waiting for signal change. FIG. 4 is a diagram showing a system configuration of the first exemplary embodiment of the present invention. FIG. 4 shows a traffic signal control apparatus 100 connected to cameras 105-1, 105-2 and a plurality of traffic signal machines 111.

The traffic signal control apparatus 100 comprises a signal control part 101, a control position selection part 102, a target vehicle determination part 103, a traffic signal machine position storing part 104 and a staying vehicle detection part 106. The traffic signal control apparatus 100 having such configuration may be a control apparatus installed in a traffic control center.

The signal control part 101 controls a traffic signal machine(s) 111 within a control target area. In addition, control content of the traffic signal machine(s) 111 by the signal control part 101 is also transmitted to the target vehicle determination part 103. Although only a single traffic signal machine is illustrated in FIG. 4, it is assumed that the traffic signal machines 111 as the control target(s) by the signal control part 101 is multiple in the following explanation of the exemplary embodiment. In addition, a macro control part that performs macro control using these traffic signal machines 111 may be installed in the traffic signal control apparatus 100, apart from (or in place of) the signal control part 101.

The target vehicle determination part 103 determines vehicle(s) to be target(s) for stop control based on control content of the traffic signal machine 111 by the signal control part 101 and image obtained from the camera 105-1. In the present exemplary embodiment, the following explanation is made under an assumption that a vehicle is determined, which has entered and passed through an intersection during signaling of yellow signal, and stop control over the vehicle is performed. Herein, determination of vehicle that has performed such particular behavior may be done using recognition technology such as that used in automated driving to recognize other vehicles, etc.

The control position selection part 102 selects position to stop a vehicle determined by the target vehicle determination part 103 based on position information of the traffic signal machine 111, which is stored in the traffic signal machine position storing part 104, and information obtained by the staying vehicle detection part 106.

Figure 9:
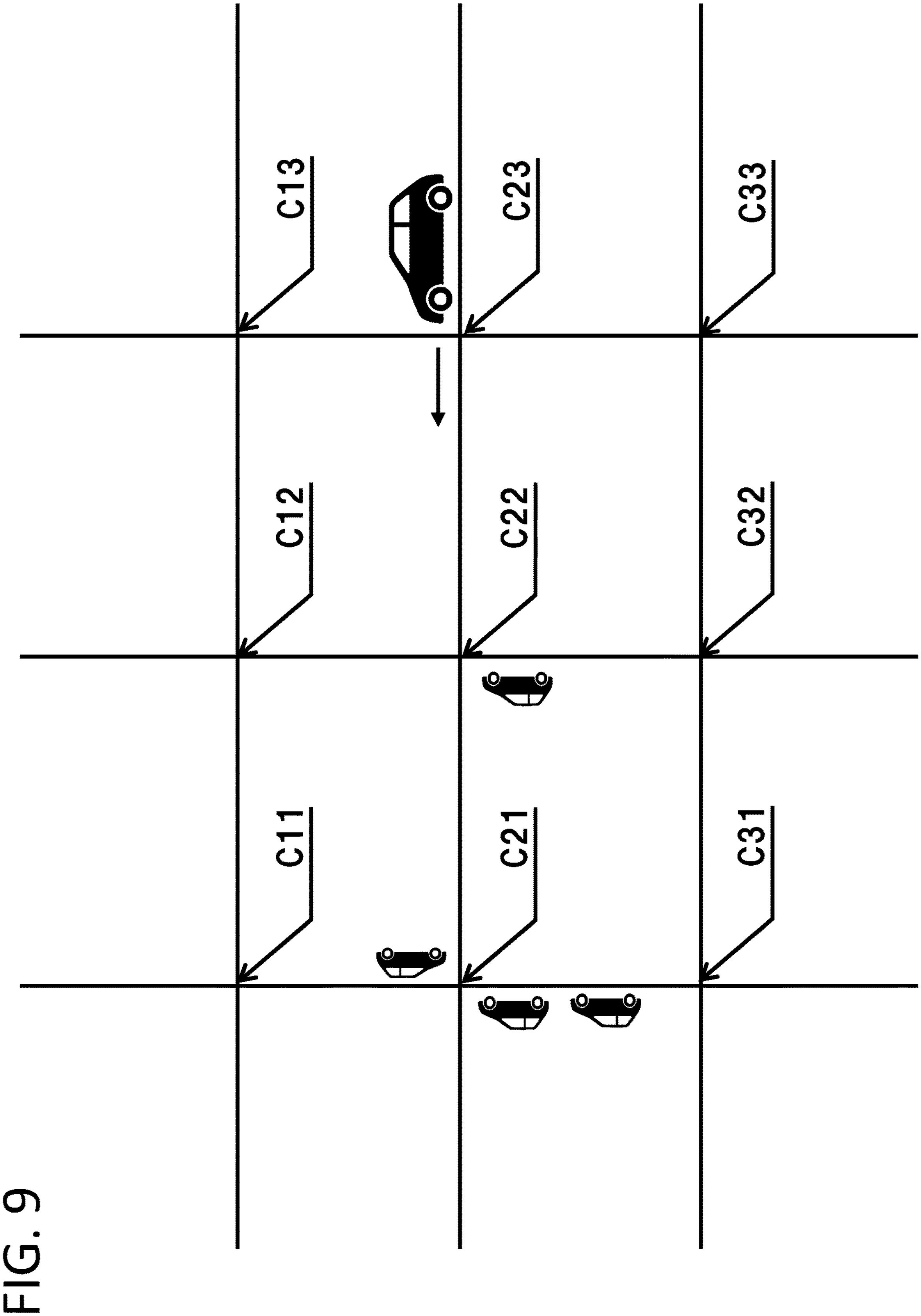
FIG. 9 is an explanatory view of operations by the traffic signal control apparatus of the first exemplary embodiment of the present invention.

The traffic signal machine position storing part 104 stores position information of the traffic signal machine 111 to be a control target by the traffic signal control apparatus 100. FIG. 5 is a diagram showing an example of the traffic signal machine position information stored in the traffic signal control apparatus 100 of the present exemplary embodiment. FIG. 5 shows traffic signal machine position information in which adjacent traffic signal machines are associated with adjacent traffic signal machine information representing direction and distance thereof for each of the traffic signal machines identified by TRAFFIC SIGNAL MACHINE ID. For example, a traffic signal machine 111 of TRAFFIC SIGNAL MACHINE ID: C11 is located at an intersection identified by mark: C11 (see FIG. 9). In addition, it is also recognized that ADJACENT TRAFFIC SIGNAL MACHINES to the traffic signal machine 111 are C12 and C21 which are located with distances West (W) 100m and South (S) 90m, respectively. By using such traffic signal machine position information, the traffic signal control apparatus may narrow down the traffic signal machines located in the direction of travel of a vehicle having entered an intersection. In addition, the distance information may be used for determination whether control by signaling would be in time or not in a case where the speed of the vehicle has been determined.

Figure 6:
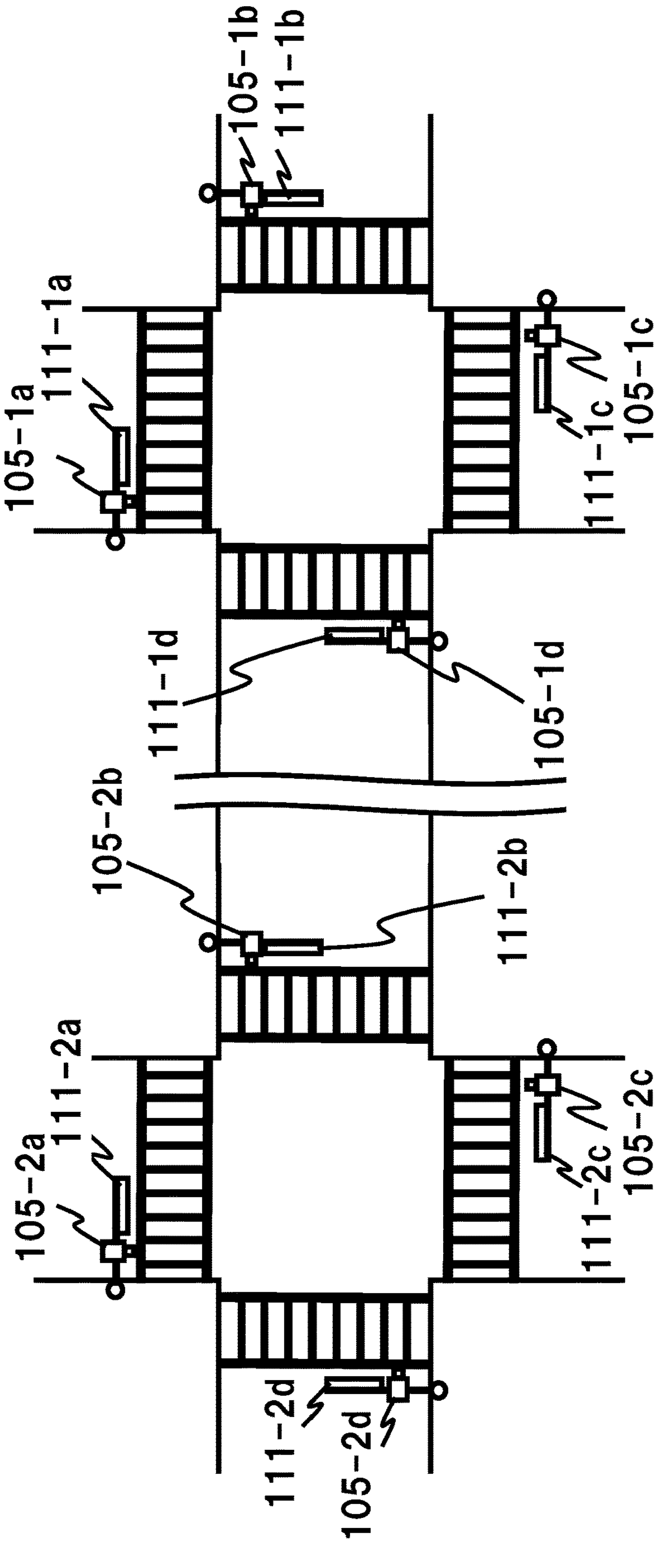
FIG. 6 is a diagram showing an example of an arrangement of cameras connected to the traffic signal control apparatus of the first exemplary embodiment of the present invention.

The cameras 105-1, 105-2 are cameras installed in different intersections. FIG. 6 is a diagram showing an example of an arrangement of cameras. FIG. 6 shows two intersections respectively having traffic signal machines 111-1*a* to 111-1*d* and traffic signal machines 111-2*a* to 111-2*d*. A left side intersection has cameras 105-2*a* to 105-2*d* which are directed to the same direction as the traffic signal machine 111-2*a* to 111-2*d*, respectively. Similarly, a left side intersection has cameras 105-1*a* to 105-1*d* which are directed to the same direction as the traffic signal machines 111-1*a* to 111-1*d*, respectively. By using so arranged cameras 105-1*a* to 105-1*d*, 105-2*a* to 105-2*d*, behavior of a vehicle entering an intersection and presence or absence of vehicle(s) waiting for signal change may be determined. The following explanation is made under an assumption that any one of cameras 105-1*a* to 105-1*d* corresponds to the camera 105-1 and the any one of cameras 105-2*a* to 105-2*d* corresponds to the camera 105-2. Herein, the arrangement of cameras is merely one example, and the number of cameras may be reduced by using cameras with wider-angle lenses.

The staying vehicle detection part 106 measures the presence or absence of vehicle(s) or pedestrian(s) waiting for signal change based on image obtained from the camera 105-2.

Figure 7:
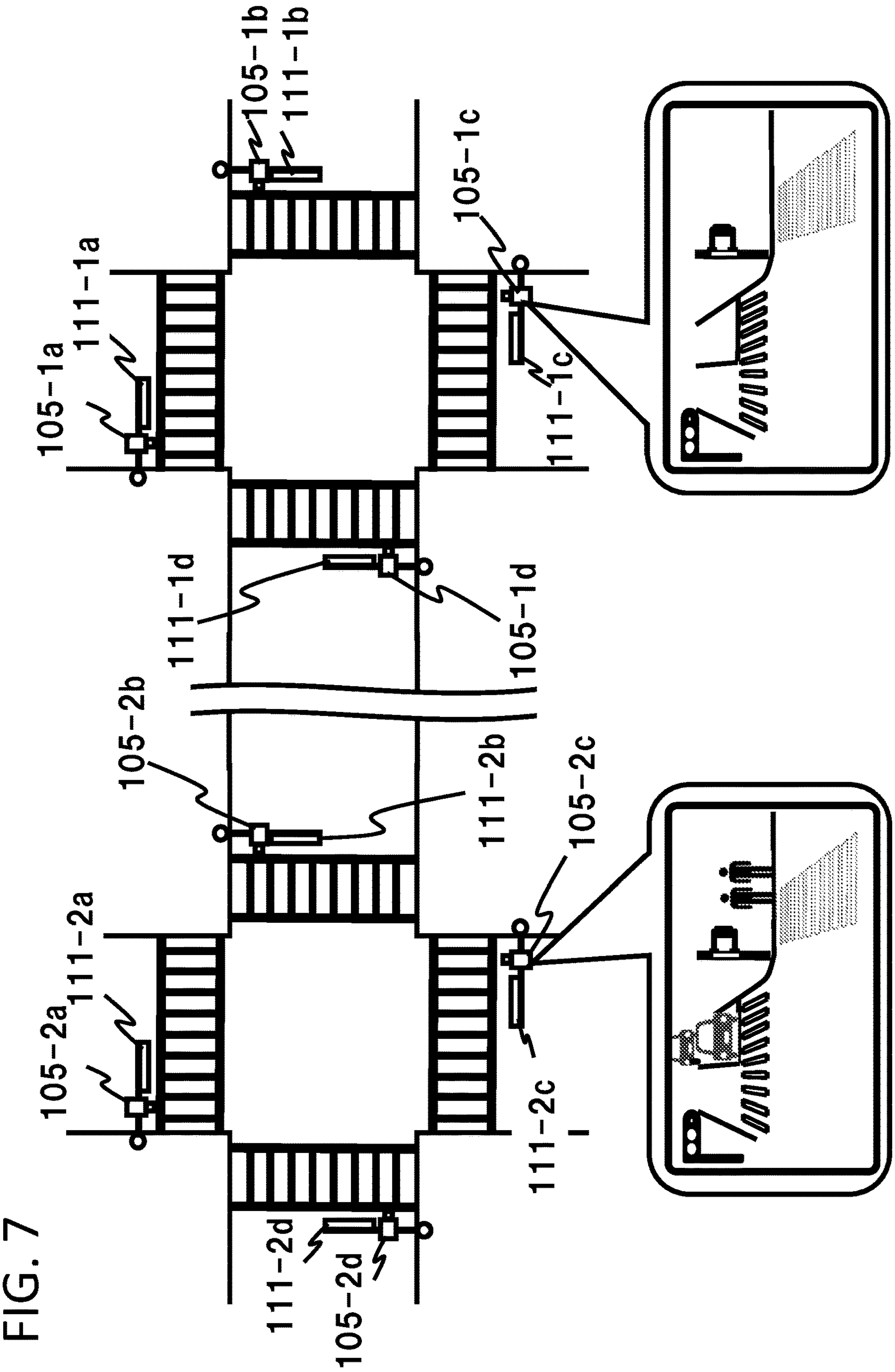
FIG. 7 is a diagram showing an example of image obtained from cameras connected to the traffic signal control apparatus of the first exemplary embodiment of the present invention.

FIG. 7 is a diagram showing an example of image obtained from cameras 105-1 and 105-2. The camera 105-1*c* at bottom right in FIG. 7 takes a shot of a vehicle entering an intersection. Using this image and control content to the traffic signal machines 111-1*a* to 111-1*d* by the signal control part 101, the vehicle may be determined, which had entered and passed through the intersection during signaling of yellow signal. In addition, a method may be also adopted, in which the traffic signal control apparatus 100 determines signaling state of the traffic signal machines 111-1*a* to 111-1*d* from images taken by the cameras 105-1*a* to 105-1*d* instead of the control content to the traffic signal machines by the signal control part 101.

The camera 105-2*c* at bottom left in FIG. 7 takes a shot of a vehicle and pedestrians waiting for signal change at an intersection. Using this image, the staying vehicle detection part 106 may measure the presence or absence of the vehicle and the pedestrians waiting for signal change. In addition, in a case where sensors, such as ultrasonic sensors, optical beacons, millimeter wave radar, infrared sensors, etc., are installed at the intersection, as sensor(s) other than the cameras, the staying vehicle detection part 106 may detects the presence or absence of the vehicle and the pedestrians waiting for signal change using these information too.

Figure 8:
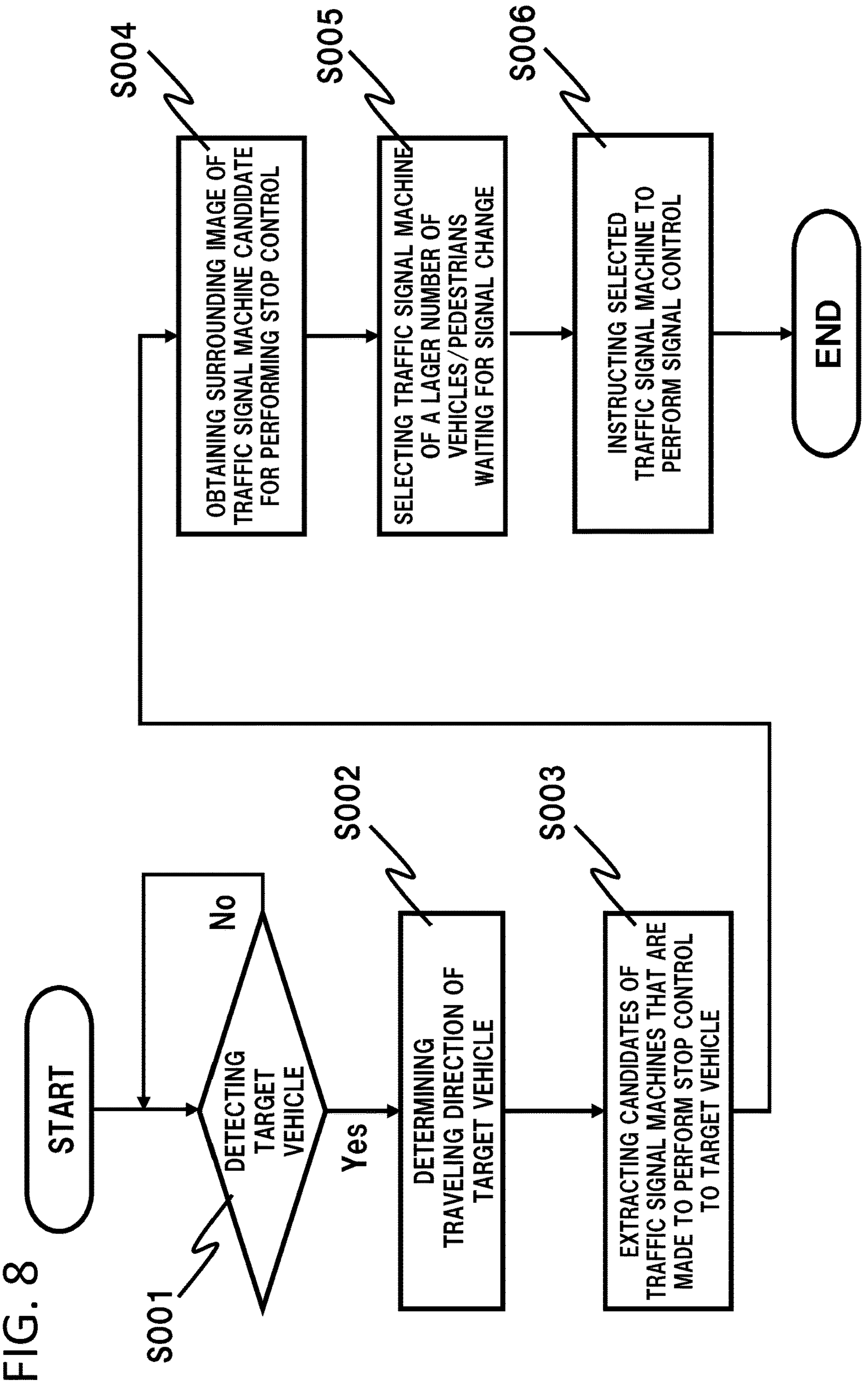
FIG. 8 is a flowchart showing operations by the traffic signal control apparatus of the first exemplary embodiment of the present invention.

Next, operations by the present exemplary embodiment are explained in detail with reference to the drawings. FIG. 8 is a flowchart showing operations by the traffic signal control apparatus of the first exemplary embodiment of the present invention. As indicated in FIG. 8, in first, the traffic signal control apparatus 100 detects a vehicle to be a target of stop control by the target vehicle determination part 103 (Step S001).

The traffic signal control apparatus 100 which has detected the vehicle to be the target of stop control determines a traveling direction of the vehicle (Step S002). Next, the traffic signal control apparatus 100 extracts traffic signal machines located in the traveling direction of the vehicle as candidates of the traffic signal machines 111 that are made to perform the stop control to the target vehicle (Step S003). For example, in a case where a vehicle traveling from the right side to the left side in FIG. 9 has not stopped against yellow signal and passed through an intersection C23 in FIG. 9, the traffic signal control apparatus 100 selects the traffic signal machines 111 installed at the intersections C22, C21 as the candidates of the traffic signal machines 111 that are caused to perform the stop control. As described above, since traffic signal machines located one or more [intersections] ahead in a traveling direction of the vehicle are selected as candidate(s) of the traffic signal machine that performs the signal control for stopping the vehicle, a more effective site may be selected in an aspect of elimination of traffic jam.

The traffic signal control apparatus 100 obtains surrounding image(s) of the traffic signal machines 111 installed at the intersections C22, C21, and detects the presence or absence of the vehicles and pedestrians waiting for signal change by the staying vehicle detection part 106 (Step S004). Herein, in a case where the vehicles and pedestrians waiting for signal change have been detected at a plurality of intersections, the traffic signal control apparatus 100 selects a traffic signal machine 111 of a larger number of the vehicles and pedestrians waiting for signal change from among the traffic signal machines 111 installed at the intersections C22, C21 (Step S005). For example, in a case of FIG. 9, since the number of the vehicles and pedestrians waiting for signal change at the intersection C21 is larger than that at the intersection C22, the traffic signal control apparatus 100 selects the traffic signal machine(s) 111 installed at the intersection C21.

The traffic signal control apparatus 100 instructs the traffic signal machine(s) 111 installed at the intersection C21 to perform signal control for stopping the target vehicle (Step S006). Accordingly, the traffic signal machine(s) 111 installed at the intersection C21 performs early switching over to green signal light and extension of red signal light. Thereby, traffic jam at the intersection C21 may be eliminated and it is realized to stop the target vehicle.

Figure 10:
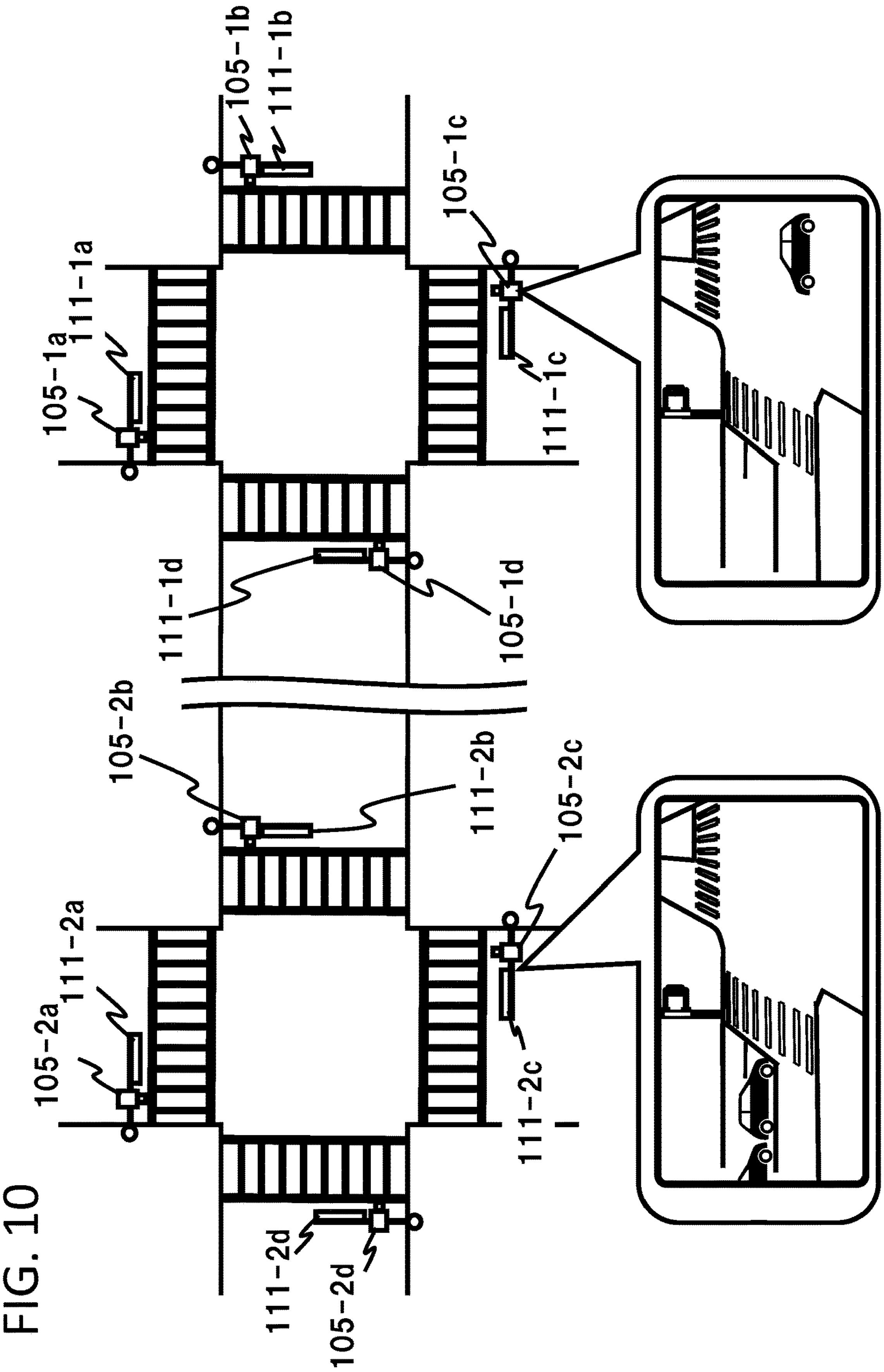
FIG. 10 is another example of image obtained from a camera connected to the traffic signal control apparatus of the first exemplary embodiment of the present invention.

Although the above example is explained under an assumption that the presence or absence of vehicles and pedestrians waiting for signal change is detected and stop control to the target vehicle is performed by a traffic signal machine(s) at that site, "traffic" to be determination target that may eliminate traffic jam is not limited to the example. For example, as illustrated in FIG. 10, there a case where a vehicle(s) waiting to turn right may be detected from image taken by a camera 105-2*c*. In such case, a traffic signal machine(s) 111 for an intersection having a larger number of vehicles waiting to turn right may be selected as the traffic signal machine(s) that performs stop control to the target vehicle(s).

Figure 11:
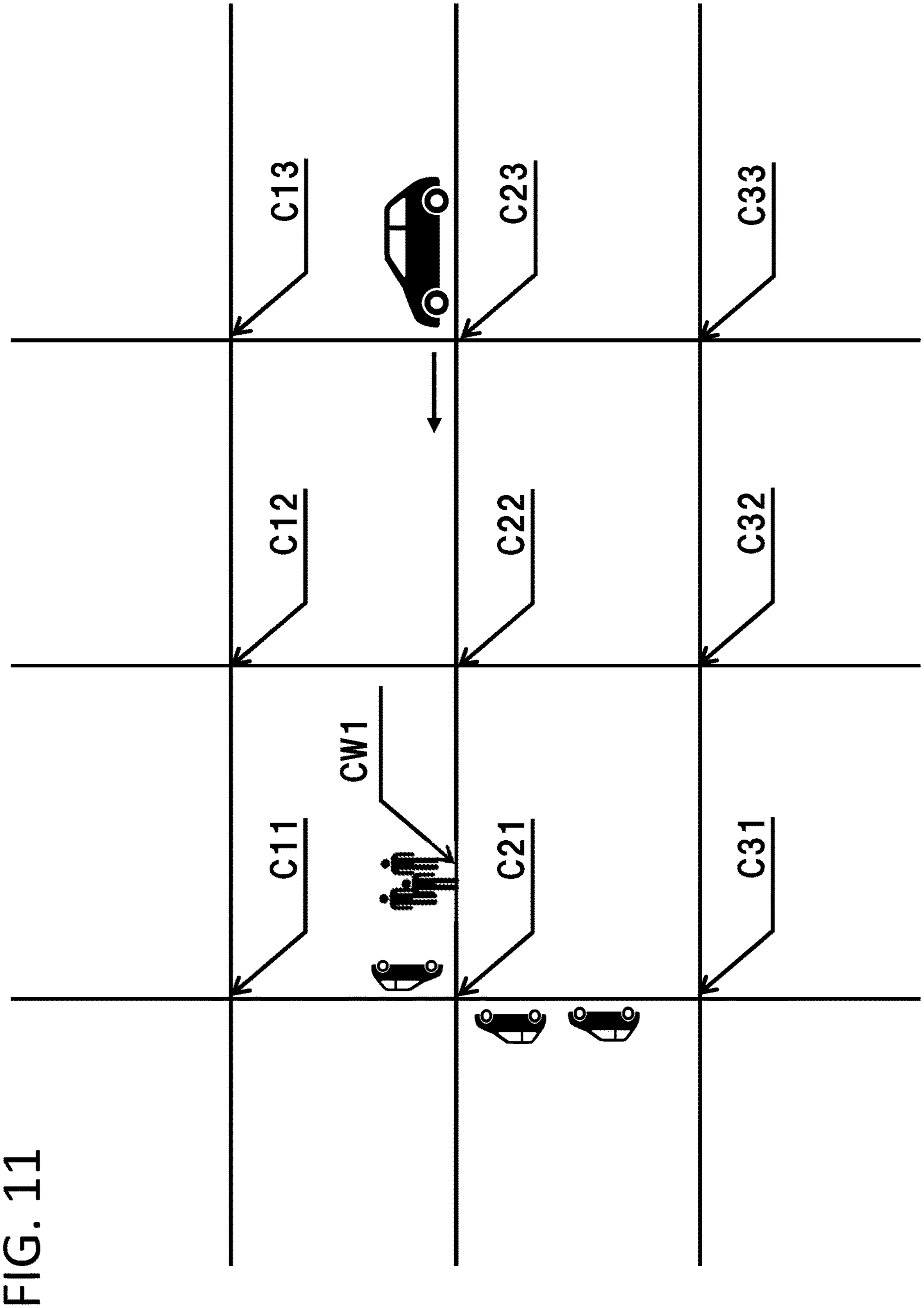
FIG. 11 is another explanatory view of operations by the traffic signal control apparatus of the first exemplary embodiment of the present invention.

In addition, although the above example is explained under an assumption that a traffic signal machine(s) that performs signal control for stopping a target vehicle is selected from among the traffic signal machines 111 installed at intersections, there are traffic signal machines which are installed at a site where a crosswalk is provided, but not at intersections (see FIG. 11). For example, as illustrated in FIG. 11, in a case where a traffic signal machine(s) is installed at a site of Mark: CW11 and pedestrians waiting for signal change have been detected, the traffic signal machine installed at the site of CW11 may be instructed to perform signal control for stopping a target vehicle. In addition, as illustrated in FIG. 11, in a case where vehicles waiting for signal change and pedestrians are respectively detected at both of an intersection C21 and CW11, a traffic signal with a higher score may be instructed to perform signal control for stopping a target vehicle by calculating the score of both by a predetermined formula or by other means.

Figure 12:
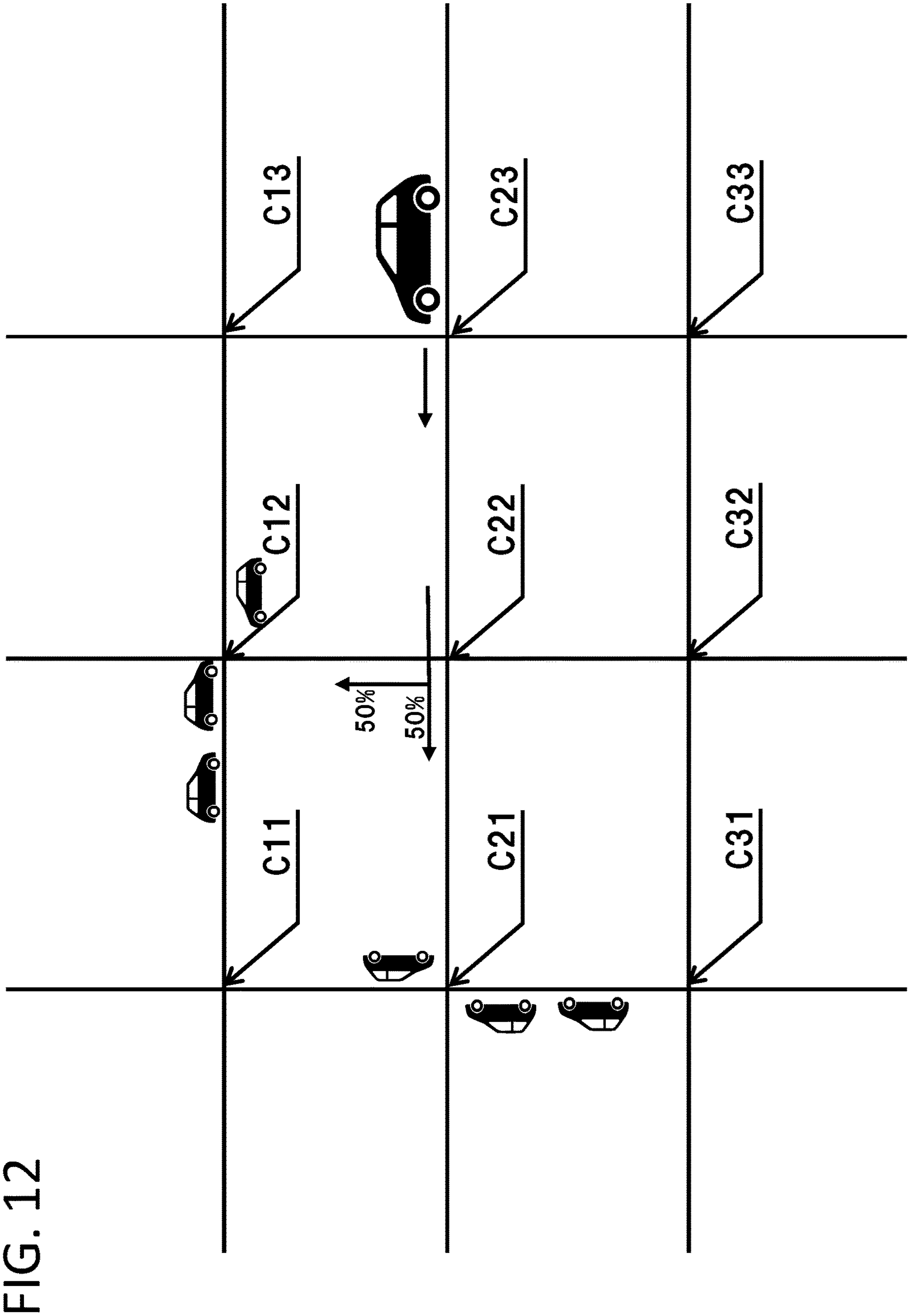
FIG. 12 is another explanatory view of operations by the traffic signal control apparatus of the first exemplary embodiment of the present invention.

In addition, although the above example is explained using with reference to an example under the assumption that a target vehicle goes straight through an intersection C22 and thus a traffic signal machine(s) installed at an intersection C21 is added to candidate, a possibility of turning left or right of the target vehicle at the intersection C22 may be also added to consideration. In such case, a control target traffic signal machine(s) may be selected by obtaining the travelling direction of the target vehicle at the intersection C22. As another method, in a case where a traffic classification by travelling directions of the intersection C22 at which a target vehicle is located and a tendency of statistical course of vehicles at the intersection C22 have been obtained, the traffic signal machines that performs signal control for stopping the target vehicle may be narrowed down using this information. For example, as illustrated in FIG. 12, in a case where a path selection probability (bifurcation rate) of vehicles coming from the right side in the figure at intersection C22 has been obtained, a traffic signal at intersection C12, in addition to intersection C21, becomes a candidate of the traffic signal machine(s) that is/are is instructed to perform signal control for stopping the target vehicle.

Second Exemplary Embodiment

Figure 13:
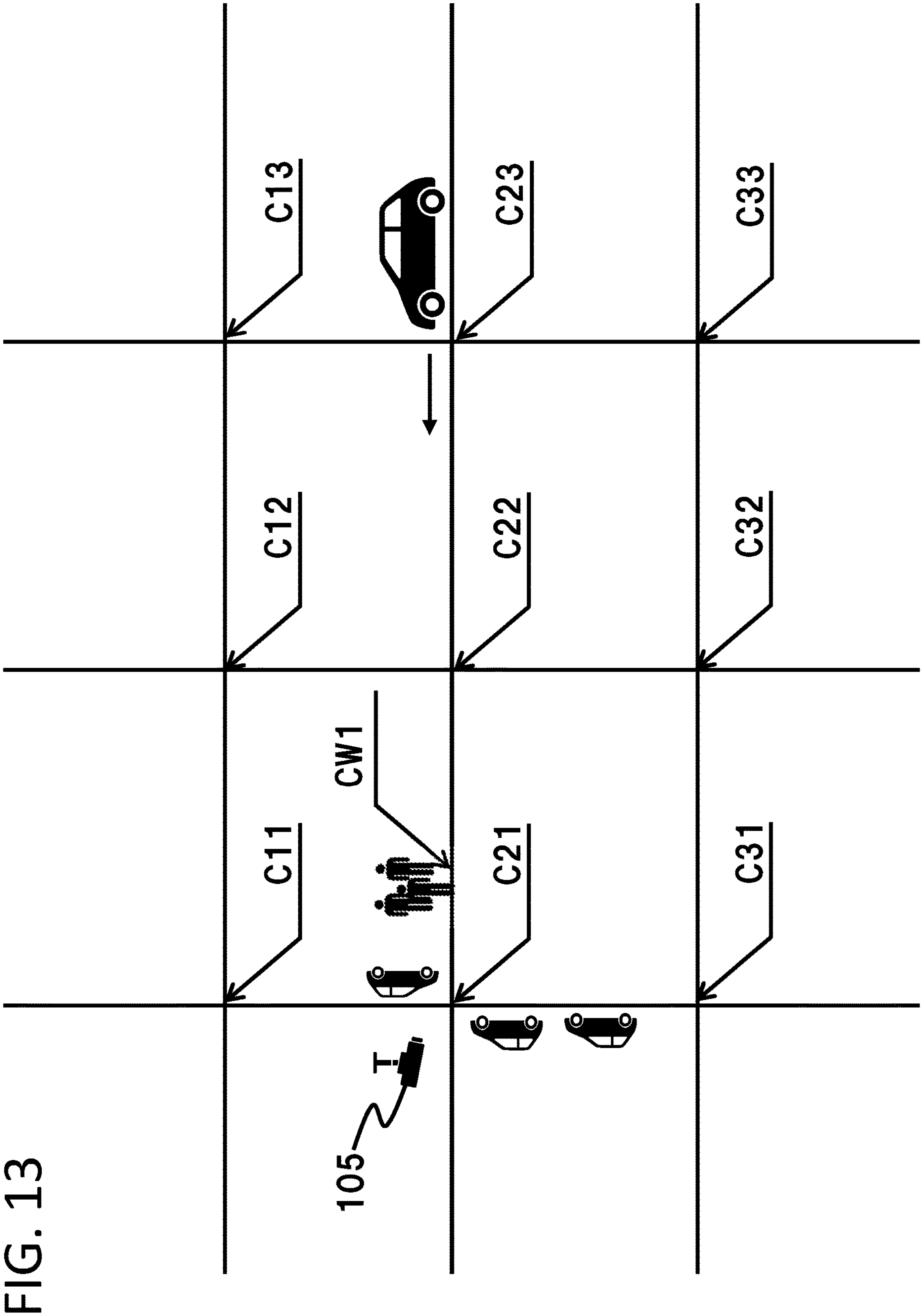
FIG. 13 is an explanatory view of operations by a traffic signal control apparatus of a second exemplary embodiment of the present invention.

In addition, in an example illustrated in FIG. 11, although the above example is explained with reference to an example in which a vehicle waiting for signal change at an intersection C21 and pedestrians waiting for signal change at a crosswalk CW11 are compared, another factor, but not simple comparison thereof, may be taken into consideration so as to select a traffic signal machine instructed to perform the signal control. For example, as illustrated in FIG. 13, in a case where a camera 105 for recording traffic violations is installed at an intersection C21, a traffic signal machine(s) at intersection C21 may be selected at a higher priority rather than at crosswalk CW11 (Second exemplary embodiment). Particularly, it may be thought that there is a case where the stop control by a traffic signal machine would be disregarded if a vehicle which has violated traffic rules such as failing to stop under yellow signal is defined as a target like as the first exemplary embodiment. As illustrated in FIG. 13, by selecting a site where the camera 105 for recording traffic violations, the traffic violations may be recorded.

As described above, each of the exemplary embodiments of the present invention has been explained. However, the present invention is not limited to the above exemplary embodiments, thus further modifications, substitutions and adjustments may be added thereto within an ambit that they do not depart from the basic technical concept of the present invention. For example, apparatus configurations, configuration of each element, representation mode of data, etc., which are illustrated in each drawing, are an example to aid in understanding the present invention, thus not limited to those configurations illustrated in these drawings. For example, although the first exemplary embodiment is explained under an assumption that a vehicle failing to stop under yellow signal is defined as a target, the behavior of the vehicle to be defined as a control target is not limited thereto. For example, vehicles that exceed the speed limit, disregard other traffic signals, tailgating, change lanes recklessly, etc., may be defined as the target of stop control. In addition to other vehicle behaviors, of course, vehicles that are found to be in violation of vehicle maintenance or not wearing seat belts may also be defined as the target of stop control.

Although omitted from the description in the above exemplary embodiments, the vehicle and its owner may be identified using license plate recognition technology, facial recognition technology, etc., as necessary. Further, the information identified in such way may also be used to query a cloud side for the vehicle's route and destination, enabling more accurate prediction of the target vehicle's path.

Further, although omitted from the description in the above exemplary embodiments, upon selecting a traffic signal machine(s) that performs signal control for stopping the vehicle, it may be possible to determine whether it is possible to stop an intended vehicle by [early] switching over to green light signal or extending red light signal, like as in PTL 1.

Further, although in the exemplary embodiments, determination is performed whether a vehicle should be stopped or not based on behavior of the vehicle entering a predetermined intersection, a case would be prospected where the vehicle would disregard the traffic signal or travel at overspeed due to emergency evacuation action. In order to avoid stopping vehicles which have made such behavior, a configuration may be also adopted, in which past behavior of each vehicle is stored for a certain period of time and used for judgement. For example, the traffic signal control apparatus may store behavior of each vehicle at an intersection for a predetermined period, and determine whether or not to stop a vehicle based on the stored behavior. For example, the traffic signal control apparatus may determine to stop a vehicle which has made a predetermined or more times of disregard of traffic signals within a predetermined period of time. There are also two possible cases for the number of times of disregard of traffic signals: a case of counting the number of times of disregard of a traffic signal at a site where the same traffic signal machine is located; and a case of counting the number of times of disregard of a traffic signal within an area of a traffic signal control apparatus.

In addition, there is a case where a certain vehicle driver habitually makes dangerous driving. In such a case, there is a possibility that the vehicle would not stop and repeatedly disregard a traffic signal even if the signal control for stopping the vehicle is performed. In light of such aspect, the traffic signal control apparatus may have a function that, for example, the signal control for stopping the vehicle is stayed (terminated) if the speed of the target vehicle is a predetermined value or more.

In addition, emergency vehicles, etc., which possibly make a behavior to be defined as a control target in the course of their duties may be excluded from the target of the stop control. In such case, a traffic signal control apparatus 100 may be equipped with a function to remove such vehicles from a control target if the control target could be recognized as an emergency vehicle, etc. from mage captured by the camera.

In addition, although the exemplary embodiments have been explained under an assumption that the traffic signal control apparatus 100 directly controls the traffic signal machines, there are also cases where a relay apparatus for controlling traffic signal machines within an intersection is installed in the intersection and the like. In such case, the traffic signal control apparatus 100 is assumed to instruct a control apparatus that controls the traffic signal machines in the corresponding intersection to perform signal control for stopping a target vehicle.

Figure 14:
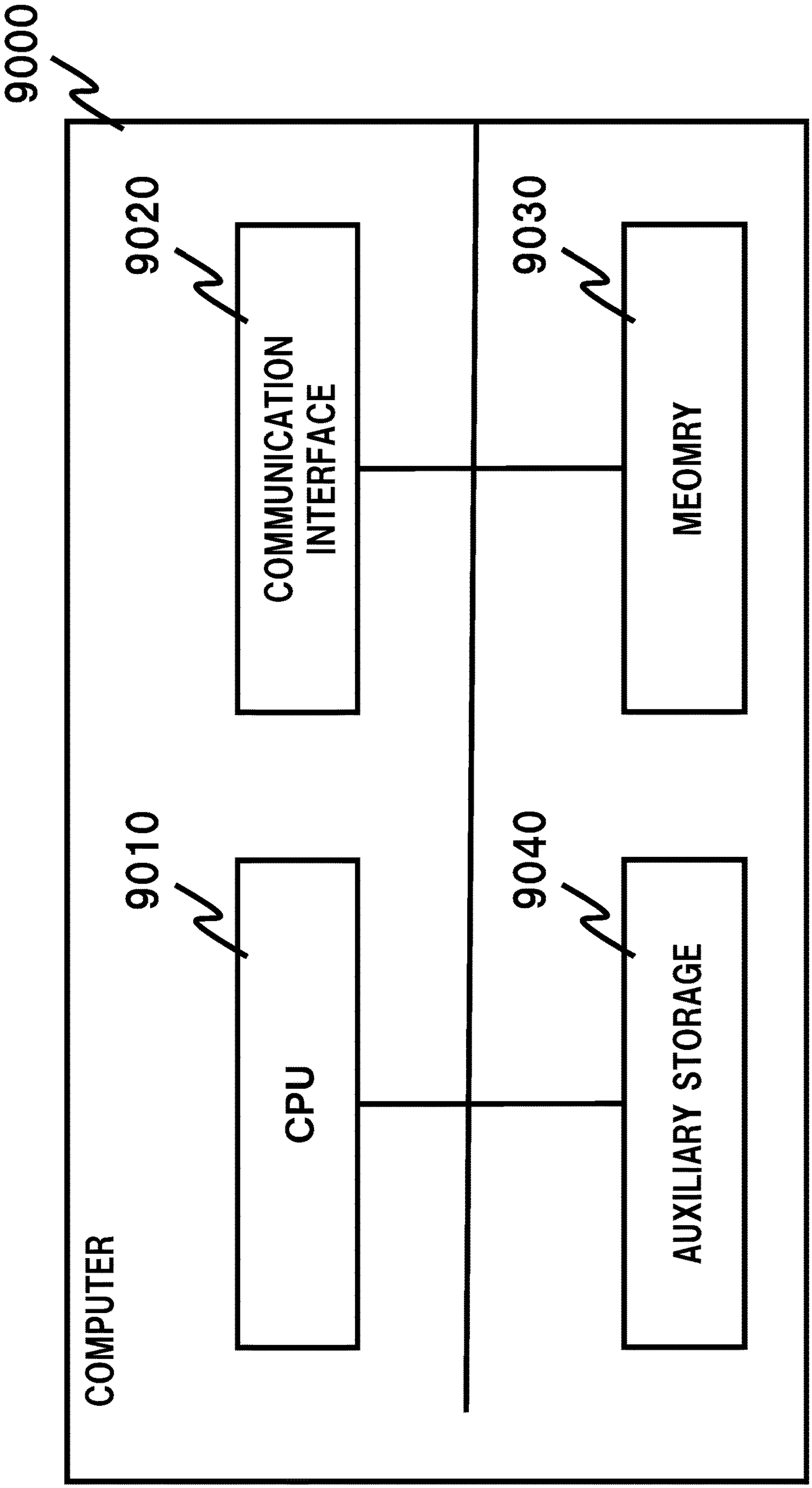
FIG. 14 is a diagram showing a configuration of a computer capable of functioning as a traffic signal control apparatus of the present invention.

Further, the operations described in the above example embodiments may be realized by a program that allows a computer (9000 in FIG. 14) functioning as the traffic signal control apparatus. Such computer is exemplified by a configuration in FIG. 14, that comprises a central processing unit (CPU) 9010, a communication interface 9020, a memory 9030, and an auxiliary storage 9040. That is, the CPU 9010 in FIG. 14 executes a target vehicle determination program and a traffic signal machine selection program.

That is, each part (processing mean and function) of the above described traffic signal control apparatus 100 can be realized by a computer program that causes a processor in these apparatuses to perform each of the above processes using its hardware.

At the last, preferable modes of the present invention are summarized.

[First Mode]

(See the traffic signal control apparatus according to the first aspect.)

[Second Mode]

The traffic signal control apparatus may adopt a configuration that when a vehicle waiting to turn right stays at an intersection where the traffic signal is installed, the traffic signal control apparatus selects the traffic signal machine at the intersection as the traffic signal machine that performs the signal control for stopping the vehicle.

[Third Mode]

The traffic signal control apparatus may adopt a configuration that, in case where there is a vehicle or pedestrian waiting for signal change at a location where the traffic signal is installed, the traffic signal control apparatus selects the traffic signal machine as the traffic signal machine that performs the signal control for stopping the vehicle.

[Fourth Mode]

The traffic signal control apparatus may adopt a configuration to select a traffic signal machine or machines located one or more ahead in the traveling direction of the vehicle as a candidate or candidates of the traffic signal machine that performs the signal control for stopping the vehicle.

[Fifth Mode]

The traffic signal control apparatus may adopt a configuration to select a vehicle that disregards a traffic signal or signals or exceeds a speed limit as a stop target.

[Sixth Mode]

The traffic signal control apparatus may adopt a configuration to select a vehicle entering an intersection during signaling of a yellow signal as a stop target.

[Seventh Mode]

The traffic signal control apparatus may adopt a configuration to determine whether or not to stop a vehicle based on past behavior of the vehicle detected by the sensor or sensors.

[Eighth Mode]

The traffic signal control apparatus may adopt a configuration to stay (terminate) the signal control for stopping the vehicle in a case where the vehicle has a speed of predetermined value or more.

[Ninth Mode]

(See the traffic signal machine control method according to the second aspect.)

[Tenth Mode]

(See the computer program according to the third aspect.)

Herein, the ninth to tenth modes may be developed to second to eighth modes, likewise as the first mode.

Herein, it is considered that each disclosure of the above Patent Literatures is incorporated herein by reference thereto, and the disclosures may be used as a base or a part of the present invention as necessary. Variations and adjustments of the example embodiments and examples are possible within the ambit of the entire disclosure (including the claims) of the present disclosure and based on the basic technical concept thereof. In addition, various combinations and selections (including non-selection) of various disclosed elements (including each element in each claim, each example embodiment, each drawing, etc.) are possible within the ambit of claims of the disclosure. Namely, the present disclosure of course includes various variations and modifications that could be made by those skilled in the art according to the overall disclosure including the claims and the technical concept. In particular, the numerical range described in the present application should be interpreted as specifically describing any numerical value or subrange that falls within that range, even if not explicitly stated. Further, each of the disclosed matters of the above cited literatures is regarded as included in the described matters in the present application, if required, on the basis of the concept of the present disclosure, as a part of the present disclosure, also that a part or entire thereof is used in combination with a described matter(s) in the present application.

REFERENCE SIGNS LIST

100, 100*a*: traffic signal control apparatus

102*a*: selection part

103*a*: determination part
101: signal control part
102: control position selection part
103: target vehicle determination part
104: traffic signal machine position storing part
105, 105-1, 105-1*a* to 105-1*d*, 105-2, 105-2*a* to 105-2*d*: camera
106: staying vehicle detection part
111, 203-1, 203-2: traffic signal machine
111-1*a* to 111-1*d*, 111-2*a* to 111-2*d*: traffic signal machine
201*a*, 202-1, 202-2: sensor
V1, V2: vehicle
9000: computer
9010: CPU
9020: communication interface
9030: memory
9040: auxiliary storage

What is claimed is:

1. A traffic signal control apparatus comprising:
at least a processor; and
a memory in circuit communication with the processor;
wherein the processor is configured to execute program instructions stored in the memory to perform processing comprising:
determining whether or not to stop a vehicle based on behavior of the vehicle detected by a sensor or sensors installed at a predetermined location or locations; and
selecting a traffic signal machine that performs signal control for stopping the vehicle from among control target traffic signal machines,
wherein the processor selects a traffic signal machine that is located in a traveling direction of the vehicle and that may eliminate traffic jam by the signal control for stopping the vehicle, and
wherein the processor determines whether or not to stop the vehicle based on past behavior of the vehicle detected by the sensor or sensors.

2. The traffic signal control apparatus according to claim 1, wherein, in a case where a vehicle waiting to turn right stays at an intersection where the traffic signal is installed, the processor selects the traffic signal machine at the intersection as the traffic signal machine that performs the signal control for stopping the vehicle.

3. The traffic signal control apparatus according to claim 1, wherein, in case where there is a vehicle or pedestrian waiting for signal change at a location where the traffic signal is installed, the processor selects the traffic signal machine as the traffic signal machine that performs the signal control for stopping the vehicle.

4. The traffic signal control apparatus according to claim 1, wherein the processor selects a traffic signal machine or machines located one or more ahead in the traveling direction of the vehicle as a candidate or candidates of the traffic signal machine that performs the signal control for stopping the vehicle.

5. The traffic signal control apparatus according to claim 1, wherein the processor selects a vehicle that disregards a traffic signal or signals or exceeds a speed limit as a stop target.

6. The traffic signal control apparatus according to claim 1, wherein the processor selects a vehicle entering an intersection during signaling of a yellow signal as a stop target.

7. The traffic signal control apparatus according to claim 1, wherein the processor stays the signal control for stopping the vehicle in a case where the speed of the vehicle is a predetermined value or more.

8. A control method of a traffic signal machine performed by a computer and comprising:
determining whether or not to stop a vehicle based on behavior of the vehicle entering a predetermined intersection; and
selecting a traffic signal machine or machines that are located in a traveling direction of the vehicle and that may eliminate traffic jam by the signal control for stopping the vehicle as a traffic signal machine or machines that perform signal control for stopping the vehicle from among control target traffic signal machines,
wherein determining whether or not to stop the vehicle comprises determining whether or not to stop the vehicle based on past behavior of the vehicle detected by the sensor or sensors.

9. A non-transitory program recording medium storing a program, wherein the program causes a computer to execute:
determining whether or not to stop a vehicle based on behavior of the vehicle entering a predetermined intersection; and
selecting a traffic signal machine or machines that are located in a traveling direction of the vehicle and that may eliminate traffic jam by the signal control for stopping the vehicle as a traffic signal machine or machines that perform signal control for stopping the vehicle from among control target traffic signal machines,
wherein determining whether or not to stop the vehicle includes determining whether or not to stop the vehicle based on past behavior of the vehicle detected by the sensor or sensors.

10. The control method according to claim 8, wherein, in a case where a vehicle waiting to turn right stays at an intersection where the traffic signal is installed, further comprising selecting the traffic signal machine at the intersection as the traffic signal machine that performs the signal control for stopping the vehicle.

11. The control method according to claim 8, wherein, in case where there is a vehicle or pedestrian waiting for signal change at a location where the traffic signal is installed, further comprising selecting the traffic signal machine as the traffic signal machine that performs the signal control for stopping the vehicle.

12. The control method according to claim 8, wherein selecting a traffic signal machine or machines comprises selecting a traffic signal machine or machines located one or more ahead in the traveling direction of the vehicle as a candidate or candidates of the traffic signal machine that performs the signal control for stopping the vehicle.

13. The control method according to claim 8, wherein selecting a traffic signal machine or machines comprises selecting a vehicle that disregards a traffic signal or signals or exceeds a speed limit as a stop target.

14. The control method according to claim 8, wherein selecting a traffic signal machine or machines comprises selecting a vehicle entering an intersection during signaling of a yellow signal as a stop target.

15. The control method according to claim 8, wherein the method comprises staying the signal control for stopping the vehicle in a case where the speed of the vehicle is a predetermined value or more.

16. The non-transitory program recording medium according to claim 9, wherein in a case where a vehicle waiting to turn right stays at an intersection where the traffic signal is installed, the program causes a computer to execute selecting the traffic signal machine at the intersection as the traffic signal machine that performs the signal control for stopping the vehicle.

17. The non-transitory program recording medium according to claim 9, wherein, in case where there is a vehicle or pedestrian waiting for signal change at a location where the traffic signal is installed, the program causes a computer to execute selecting the traffic signal machine as the traffic signal machine that performs the signal control for stopping the vehicle.

18. The non-transitory program recording medium according to claim 9, wherein, the program causes a computer to execute selecting a traffic signal machine or machines located one or more ahead in the traveling direction of the vehicle as a candidate or candidates of the traffic signal machine that performs the signal control for stopping the vehicle.

19. The traffic signal control apparatus according to claim 1, wherein the processor determines to not stop the vehicle, in case where the vehicle is an emergency vehicle.

* * * * *